July 6, 1943. C. F. IRISH 2,323,773
APPARATUS FOR THE TREATMENT OF SOIL
Filed Nov. 17, 1941
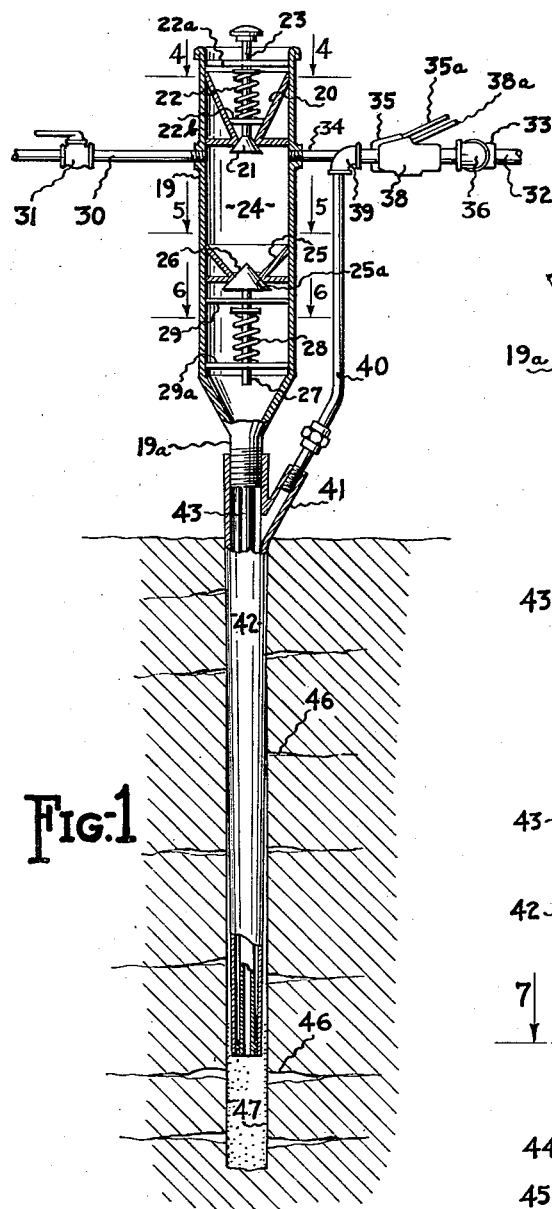
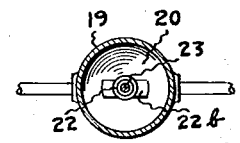
Fig. 4
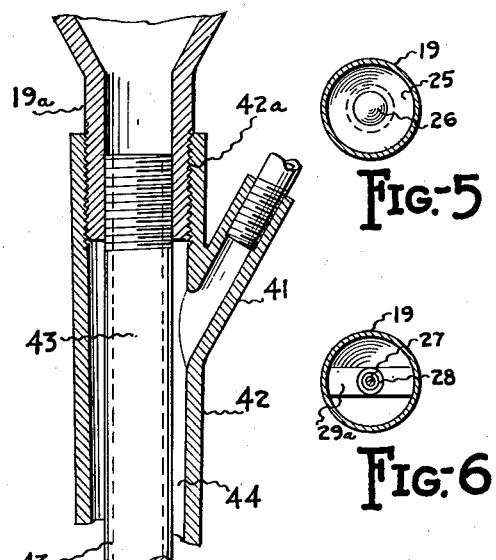
Fig. 5
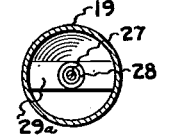
Fig. 6
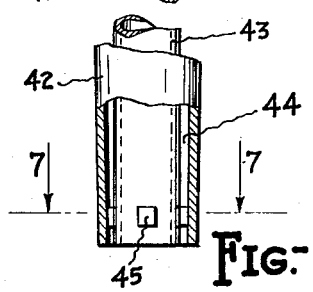
Fig. 2
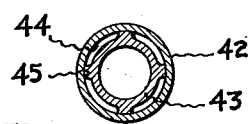
Fig. 7
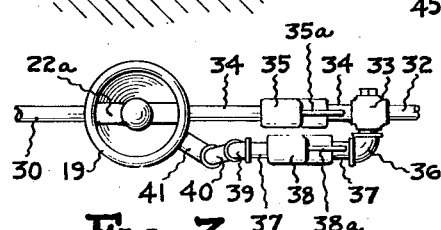
Fig. 3
INVENTOR.
CHARLES F. IRISH
BY Hull & West
ATTORNEYS.

Patented July 6, 1943

2,323,773

UNITED STATES PATENT OFFICE 2,323,773

APPARATUS FOR THE TREATMENT OF SOIL

Charles F. Irish, Bratenahl, Ohio

Application November 17, 1941, Serial No. 419,441

5 Claims. (Cl. 47—48)

This invention relates to a process of and apparatus for treating soil, and has for its general object to provide a process and apparatus whereby soil may be efficiently aerated and also treated with soil rectifying materials, such as powdered or liquid fungicides and insecticides, fertilizer, lime, sulphur, or other materials capable of correcting acidity and alkalinity and improving or protecting plant growth.

In my prior Patent No. 2,083,153, there is shown and described an apparatus of the same general character as that forming the subject matter of this application. A less general purpose and object of this invention is to effect certain improvements in the construction of such apparatus and in the resulting mode of treating the soil with air or other pressure fluid and soil rectifying material whereby the efficiency of such apparatus is increased in the respects to be pointed out hereinafter.

In the drawing forming part hereof, Fig. 1 represents a sectional elevational view of an apparatus constructed in accordance with my invention, showing the manner in which it is utilized in connection with the soil to be treated; Fig. 2 a similar view, on an enlarged scale, of the tubular portion of the said apparatus which is inserted into the soil; Fig. 3 a detail in plan of the apparatus shown in Fig. 1; Figs. 4, 5 and 6 are details in section taken on the lines 4—4, 5—5 and 6—6 of Fig. 1; and Fig. 7 is a detail in section taken on the line 7—7 of Fig. 2.

Describing by reference characters the various parts shown in the aforesaid drawing, 19 denotes a cylindrical casing which supports at the upper end thereof a feeding hopper 20, the said hopper being shown as located within the top of the casing and as provided with a valve 21 adapted normally to be held in closed relation with the bottom outlet of the hopper by means of a spring 22 surrounding the stem 23 which is shown as mounted in guide straps 22$^a$ and 22$^b$.

Within and forming a compartment 24 below the bottom of the hopper 20 is a short hopper 25 having a bottom discharge outlet 25$^a$ which is normally closed by a conical valve 26 mounted on a stem 27 extending downwardly from the said valve, the valve being normally held to its seat by means of a spring 28 located between the guide straps, 29, 29$^a$ through which the stem extends. 30 denotes a pipe communicating with the chamber 24 and which is adapted to deliver thereinto a liquid, such as water, or liquid insecticide or fungicide or liquid in which a fertilizer is dissolved or suspended, the said pipe being provided with a valve 31.

32 denotes a pipe through which air under pressure may be supplied into the compartment 24 and into the outer tubular section of the tool adjacent to the point at which the casing 19 communicates therewith. For the purpose of enabling the air to be supplied in this manner, the following construction is provided:

33 denotes an X-coupling into one of the central branches of which the pipe 32 is threaded and from the other central branch of which a pipe 34 leads to and communicates with the compartment 24. This pipe is provided with a valve 35 having an operating handle 35$^a$ extending longitudinally of the said pipe. One of the lateral branches of the X is shown as closed while an elbow 36 is connected to the opposite branch of the X. To the other end of this elbow there is connected a pipe 37 extending close to and parallel with the pipe 34 and provided therewithin with a valve 38 having an operating handle 38$^a$ extending longitudinally thereof and in proximity to and parallel with the handle 35$^a$, whereby both valve handles may be grasped simultaneously by the operator. The pipe 37 is connected with an elbow 39 from which a pipe 40 extends downwardly and has its lower end threadedly connected with an internal thread provided in a Y connection 41 preferably formed with and extending outwardly and upwardly from one side of the outer tubular section 42 of the tool which is to be inserted into the soil. The said outer section of the tool is gradually tapered from the upper to the lower end thereof, the inclination of such outer wall being approximately 2°.

The upper end of the tubular section 42 is provided with an internally threaded opening 42$^a$ into which a sleeve 19$^a$, which may be formed with the lower end of the casing 19, is adapted to be threaded. This nipple is itself internally threaded for the reception of the exteriorly threaded upper end of the inner tubular section 43 of the tool. This inner section is cylindrical in shape and preferably extends the full length of the outer section, forming an annular passageway 44 between itself and the outer section, the lower end of the inner section being centered within and spaced from the inner wall of the outer section by lugs 45 which may be formed on said inner section.

In practice, these lugs are about ⅛" in length whereby the lower end of the inner tubular section may be spaced a corresponding distance from the inner wall of the surrounding outer section.

In practice, I pre-form a hole of cylindrical shape in the soil by means of a bar or auger, the diameter of said hole being less than the diameter of the upper portion of the outer tubular section of the tool, and I insert the outer section into the hole thus formed under sufficient pressure to provide a sealing fit between the upper portion of the said section and the surrounding soil. The hole thus preformed is of such depth as to provide a chamber 47 below the lower end of the tool of suitable depth to permit the pressure fluid, and the mixture of pressure fluid and soil-rectifying material to be distributed upwardly therefrom into the space surrounding the outer tubular section.

With the parts constructed and arranged as described, air or other fluid under pressure may be supplied through the pipe 32, valve 38, pipe 40, and Y-connection 41 and thence through the annular passage 44 into the space surrounding the unsealed portion of the outer tubular section. The pressure under which this air or other fluid is introduced is sufficient to produce what is shown in the industry to which this invention relates as a "heave" in the soil, from which fissures or fractures 46 extend, the pressure which I have employed being 100 lbs. per square inch and upwardly.

If desired to supply a mixture of air and soil-rectifying material to the fissures or fractures thus formed, the valve 38 may be closed and the valve 35 opened, whereupon air supplied through said valve is mingled with the soil rectifying material delivered from the hopper 20 in the chamber 24 and, if desirable, with water or other soil-conditioning liquid delivered into said chamber through the pipe 30. The mixture of air and soil-rectifying material is delivered from chamber 24 past valve 26 into the inner tubular section of the tool 43 and thence into the fissures or fractures.

It is desirable, after the fractures or fissures have been formed, to maintain the same open for the reception of the soil-rectifying material. This can be conveniently accomplished by the construction shown herein wherein, by depressing the valve handle 38ª while the valve handle 35ª is also depressed, air will continue to be supplied to the fractures or fissures under sufficient pressure to maintain the same open and thus permit the soil-rectifying material, together with the air with which it is mingled, to be distributed within the fissures or fractures. The location of the valve handles so that they may be grasped simultaneously by the hand of the operator renders this operation particularly easy of accomplishment.

There is a liability that the outlet from the casing 19 will at times become clogged with the soil rectifying material where the only source of air supply is through the said casing. As is the case with the construction shown in my Patent No. 2,083,153, considerable trouble and delay have been experienced in overcoming said difficulty. By my construction shown herein, I am able to supply the air to the soil independently of the casing, through the pipe 40.

It will be evident that I have produced an apparatus whereby soil may be aerated and/or rectified in a particularly efficient manner.

Having thus described my invention, what I claim is:

1. In an apparatus for the treatment of soil, a tool comprising an inner tubular section provided with a passageway having an outlet, and an outer downwardly tapered tubular section surrounding and spaced from the inner tubular section and providing, with said inner section, an annular passageway having an outlet, said outer tubular section adapted to seal the upper portion of the soil into which it is inserted, a pipe communicating with the passageway formed within the inner tubular section, a pipe connected with the said annular passageway, means for supplying fluid under pressure through one of said pipes to the passageway with which it communicates, means for supplying a mixture of fluid under pressure and soil rectifying material through the pipe which communicates with the other passageway, and valve mechanism controlling the flow of fluid and the mixture of fluid with soil rectifying material through the respective pipes.

2. In an apparatus for the treatment of soil, a tool comprising an inner tubular section provided with a passageway provided with an outlet at the lower end thereof, and an outer downwardly tapered tubular section surrounding and spaced from the inner tubular section and providing, with said inner section, an annular passageway, closed at the top and open at the bottom, said outer tubular section adapted to seal the upper portion of the soil into which it is inserted, a pipe communicating with the passageway formed within the inner tubular section and a pipe connected with the said annular passageway, means for supplying fluid under pressure through one of said pipes to the annular passageway, means for supplying a mixture of fluid under pressure and soil rectifying material through the pipe which communicates with the passageway in said inner section, and valve mechanism controlling the flow of fluid and the mixture of fluid with soil rectifying material through the respective pipes.

3. An apparatus for the treatment of soil comprising a casing having a bottom outlet, means for supplying soil rectifying material to said casing above the bottom thereof, a tool comprising an inner tubular section having a passageway therethrough and connected at its upper end to the bottom outlet of said casing, and an outer downwardly tapered tubular section surrounding and spaced from the inner tubular section to provide an annular space therebetween having a bottom outlet and adapted to seal the portion of the wall of the soil surrounding its upper portion, a pipe for supplying fluid under pressure into the said casing above the bottom thereof, a pipe for supplying fluid under pressure, independently of said casing, to the annular passageway formed between the inner and outer tubular sections, and valves controlling the supply of fluid through said pipes.

4. In the apparatus set forth in claim 2, the pipes having portions located adjacent to each other and the valves in said pipes having actuating handles located in proximity to each other thereby to enable them to be grasped simultaneously by the hands of an operator.

5. In the apparatus set forth in claim 3, the pipes having portions located adjacent to each other and the valves in said pipes having actuating handles located in proximity to each other thereby to enable them to be grasped simultaneously by the hands of an operator.

CHARLES F. IRISH.